US008130218B2

United States Patent
Chen et al.

(10) Patent No.: US 8,130,218 B2
(45) Date of Patent: Mar. 6, 2012

(54) ELECTRONIC DEVICE OF A SOURCE DRIVER IN AN LCD DEVICE FOR ENHANCING OUTPUT VOLTAGE ACCURACY

(75) Inventors: Ji-Ting Chen, Hsinchu County (TW); Ju-Lin Huang, Taipei County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 760 days.

(21) Appl. No.: 12/051,837

(22) Filed: Mar. 19, 2008

(65) Prior Publication Data

US 2009/0153547 A1 Jun. 18, 2009

(30) Foreign Application Priority Data

Dec. 14, 2007 (TW) ............................... 96147808 A

(51) Int. Cl.
*G06F 3/038* (2006.01)
*G09G 5/00* (2006.01)
*G09G 3/36* (2006.01)

(52) U.S. Cl. ........... 345/215; 345/96; 345/100; 345/204

(58) Field of Classification Search ............. 345/87–107
See application file for complete search history.

(56) References Cited

U.S. PATENT DOCUMENTS

2006/0071898 A1* 4/2006 Kim .............................. 345/100
2006/0232539 A1* 10/2006 Hashimoto ..................... 345/96

* cited by examiner

*Primary Examiner* — Bipin Shalwala
*Assistant Examiner* — Ryan A Lubit
(74) *Attorney, Agent, or Firm* — Winston Hsu; Scott Margo

(57) ABSTRACT

An electronic device of a source driver in an LCD device, for enhancing accuracy of voltage outputted to an equivalent capacitor of a panel of the LCD device, includes a first node, a second node, an output unit, a first charge sharing switch, a second charge sharing switch, a first precharge switch, and a second precharge switch. The electronic device only uses two precharge switches to implement the precharge function and can decrease the current limiting resistor for enhancing the output voltage accuracy and decrease the charge time of the equivalent capacitor.

20 Claims, 5 Drawing Sheets

ELECTRONIC DEVICE OF A SOURCE DRIVER IN AN LCD DEVICE FOR ENHANCING OUTPUT VOLTAGE ACCURACY

BACKGROUND OF THE INVENTION

1. Field of the Invention

The present invention relates to an electronic device of a source driver in an LCD device, and more particularly, to an electronic device for enhancing the accuracy of output voltage to an equivalent capacitor of a panel of the LCD device.

2. Description of the Prior Art

A prior art source driver in an LCD device includes a charge sharing circuit and a precharge circuit, for charge reuse and decreasing a charge time to an expected voltage level for an equivalent capacitor of a panel of the LCD device. Generally, the charge sharing circuit and the precharge circuit are composed of a plurality of transistor switches. A transistor switch is equivalent to a resistor when turned on. The equivalent resistor results in the current limiting effect and inaccuracy of output voltage to the panel and influences the charge time to the expected voltage level for the equivalent capacitor of the panel. To eliminate the equivalent resistor effect, the size and area of the transistor switch has to be enlarged. Therefore, in design of a source driver, the size of the transistor switch used in the charge sharing circuit and the precharge circuit need to be customized for an acceptable equivalent resistor.

Please refer to FIG. 1 and FIG. 2. FIG. 1 is a block diagram of an electronic device 10 of a source driver in an LCD device according to the prior art. The electronic device 10 is utilized in the source driver for charge sharing and precharging for a channel of the source driver. The electronic device 10 comprises an output unit 100, a node VCH, and switches 102, 104, and 106. The output unit 100 coupled to a capacitor 108 comprises a switch 101, for generating an analog signal and outputting the analog signal by controlling the switch 101 according to a control signal S1 generated by the source driver. The capacitor 108 is an equivalent capacitor as a characteristic model of a panel of the LCD device. One terminal of each of the switches 102, 104 and 106 is coupled to the output unit 100 and the capacitor 108; the other terminal of each of the switches 102, 104 and 106 is respectively coupled to the node VCH, a first voltage generator 14 and a second voltage generator 16. The switches 102, 104, and 106 control the connections between the two terminals according to the control signals S2, SA and SB. In addition, the first voltage generator 14 and the second voltage generator 16 are utilized for generating voltages with opposite polarity.

When the output unit 100 outputs the analog signal according to the control signal S1, the control signals S2, SA and SB respectively turn off the switches 102, 104 and 106, thereby the output unit 100 outputs the analog signal to the capacitor 108. On the contrary, when the output unit 100 does not output the analog signal, the control signals S2, SA and SB respectively control the switches 102, 104 and 106 for charge sharing and precharging. In detail, when the control signal S2 controls the switch 102 to be turned on and the control signals SA, SB control the switches 104, 106 to be turned off, the source driver performs charge sharing on the capacitor 108. When the control signal S2 controls the switch 102 to be turned off, and the control signals SA, SB control the switches 104, 106 to be turned on, the source driver performs precharging on the capacitor 108.

Note that, the electronic device 10 is utilized for a single channel of the source driver. For charge sharing of a single channel, the capacitor 108 transmits charge to the node VCH by the switch 102. The charge sharing scheme is identical on each channel of the source driver. At the same time, there is a current limiting resistor on the current path of charge sharing. The current limiting resistor is also an ON-resistance of the switch 102. Let the value of the ON-resistance of the switch 102, 104 or 106 be R, so that the value of the current limiting resistor is R. In addition, the switches 104 and 106 are turned on in turn when the source driver performs precharging on the capacitor 108, thus, for each channel, the current limiting resistor on the current path of charge sharing is the ON-resistance of the switch 104 or 106, R.

For the relationship between the voltage level of the capacitor 108 and the control signals S1, S2, SA and SB, please refer FIG. 2. FIG. 2 is a timing diagram of the electronic device 10. CH1 and CH3 represent the output of odd channels of the source driver. CH2 and CH4 represent the output of even channels of the source driver. Note that, the connection between the switch 104 and the first voltage generator 14 (or between the switch 106 and the second voltage generator 16) is different in odd channels and in even channels. Therefore, the source driver can precharge on the capacitor 108 for opposite voltage level by odd channels and even channels.

Because the switch 102, 104 or 106 are transistor switches and the ON-resistance of the switch 102, 104 or 106 is also a current limiting resistor, the current limiting resistor results in inaccuracy of output voltage to the capacitor 108 and influences the charge time to an expected voltage level for the capacitor 108. In this situation, the only way to enhance output voltage accuracy is to adjust the size of the transistor switch. Due to a large amount of transistor switches used for charge sharing and precharging in the prior art source driver, the area and production cost of the charge sharing circuit and the precharge circuit are expensive.

SUMMARY OF THE INVENTION

It is therefore a primary objective of the claimed invention to provide an electronic device of a source driver in an LCD device for enhancing output voltage accuracy of the source driver.

The present invention discloses an electronic device of a source driver in an LCD device, for enhancing accuracy of voltage outputted to an equivalent capacitor of a panel of the LCD device comprising a first node, a second node, an output unit coupled to the source driver and the equivalent capacitor, for outputting an analog signal according to the signal generated by the source driver, a first charge sharing switch comprising a first terminal coupled to the output unit and the equivalent capacitor and a second terminal coupled to the first node, for controlling the connection between the first terminal and the second terminal according to a first control signal, a second charge sharing switch comprising a first terminal coupled to the output unit and the equivalent capacitor and a second terminal coupled to the second node, for controlling the connection between the first terminal and the second terminal according to a second control signal, a first precharge switch comprising a first terminal coupled to the first node and a second terminal coupled to a first voltage generator, for controlling the connection between the first terminal and the second terminal according to a third control signal, and a second precharge switch comprising a first terminal coupled to the second node and a second terminal coupled to a second voltage generator, for controlling the connection between the first terminal and the second terminal according to a fourth control signal.

The present invention further discloses an electronic device of a source driver in an LCD device, for enhancing accuracy of voltage outputted to a plurality of equivalent capacitors of a panel of the LCD device comprising a first node, a second node, a plurality of first output devices, each first output device comprising an output unit coupled to the source driver and one of the plurality of equivalent capacitors, for outputting an analog signal according to the signal generated by the source driver, a first charge sharing switch comprising a first terminal coupled to the output unit and the equivalent capacitor and a second terminal coupled to the first node, for controlling the connection between the first terminal and the second terminal according to a first control signal, a second charge sharing switch comprising a first terminal coupled to the output unit and the equivalent capacitor and a second terminal coupled to the second node, for controlling the connection between the first terminal and the second terminal according to a second control signal, a plurality of second output devices, each second output device comprising an output unit coupled to the source driver and one of the plurality of equivalent capacitors, for outputting an analog signal according to the signal generated by the source driver, a first charge sharing switch comprising a first terminal coupled to the output unit and the equivalent capacitor and a second terminal coupled to the second node, for controlling the connection between the first terminal and the second terminal according to a first control signal, a second charge sharing switch comprising a first terminal coupled to the output unit and the equivalent capacitor and a second terminal coupled to the first node, for controlling the connection between the first terminal and the second terminal according to a second control signal, a first precharge switch comprising a first terminal coupled to the first node and a second terminal coupled to a first voltage generator, for controlling the connection between the first terminal and the second terminal according to a third control signal, and a second precharge switch comprising a first terminal coupled to the second node and a second terminal coupled to a second voltage generator, for controlling the connection between the first terminal and the second terminal according to a fourth control signal.

These and other objectives of the present invention will no doubt become obvious to those of ordinary skill in the art after reading the following detailed description of the preferred embodiment that is illustrated in the various figures and drawings.

DETAILED DESCRIPTION

In the prior art, to enhance output voltage accuracy is to adjust the size of the transistor switch, and the area and production cost increases accordingly. Therefore, the present invention provides an electronic device of a source driver in an LCD device. The present invention can enhance output voltage accuracy by the reconfiguration of the amount and location of the transistor switches instead of adjusting the size of the transistor switch.

Figure 1:
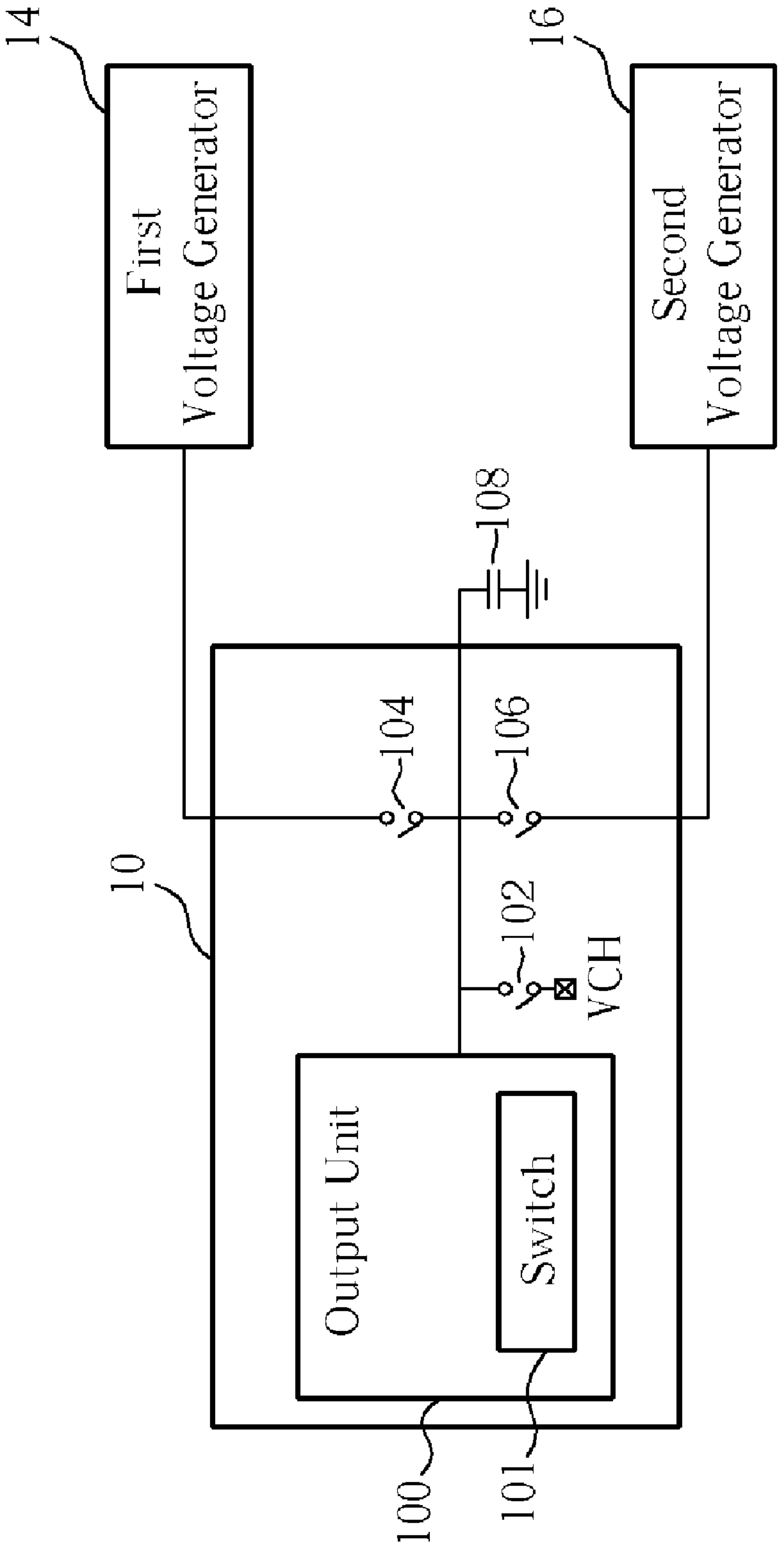
FIG. 1 PRIOR ART
FIG. 1 is a block diagram of an electronic device of a source driver in an LCD device according to the prior art.
Figure 2:
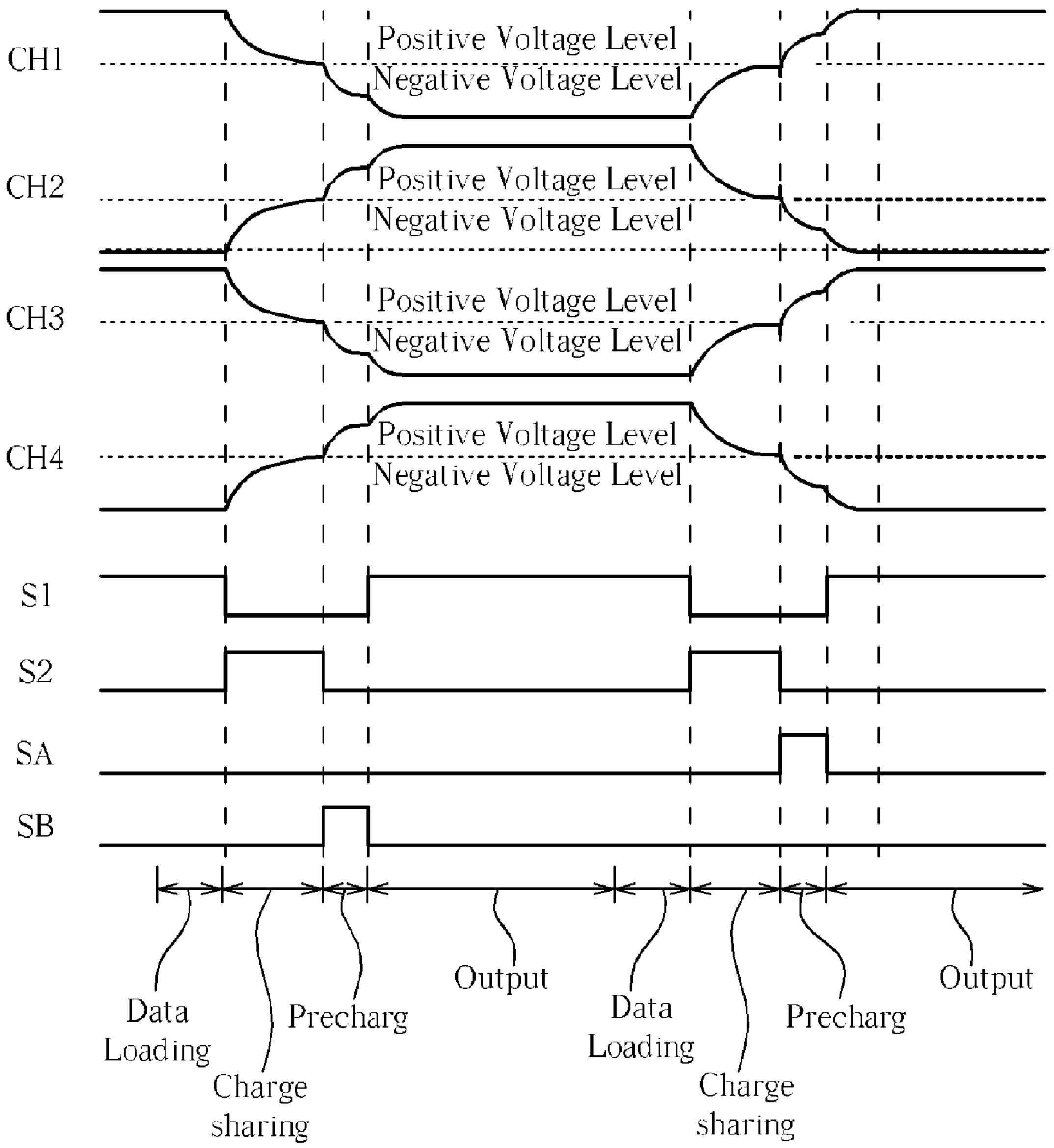
FIG. 2 PRIOR ART
FIG. 2 is a timing diagram of the electronic device in FIG. 1.
Figure 3:
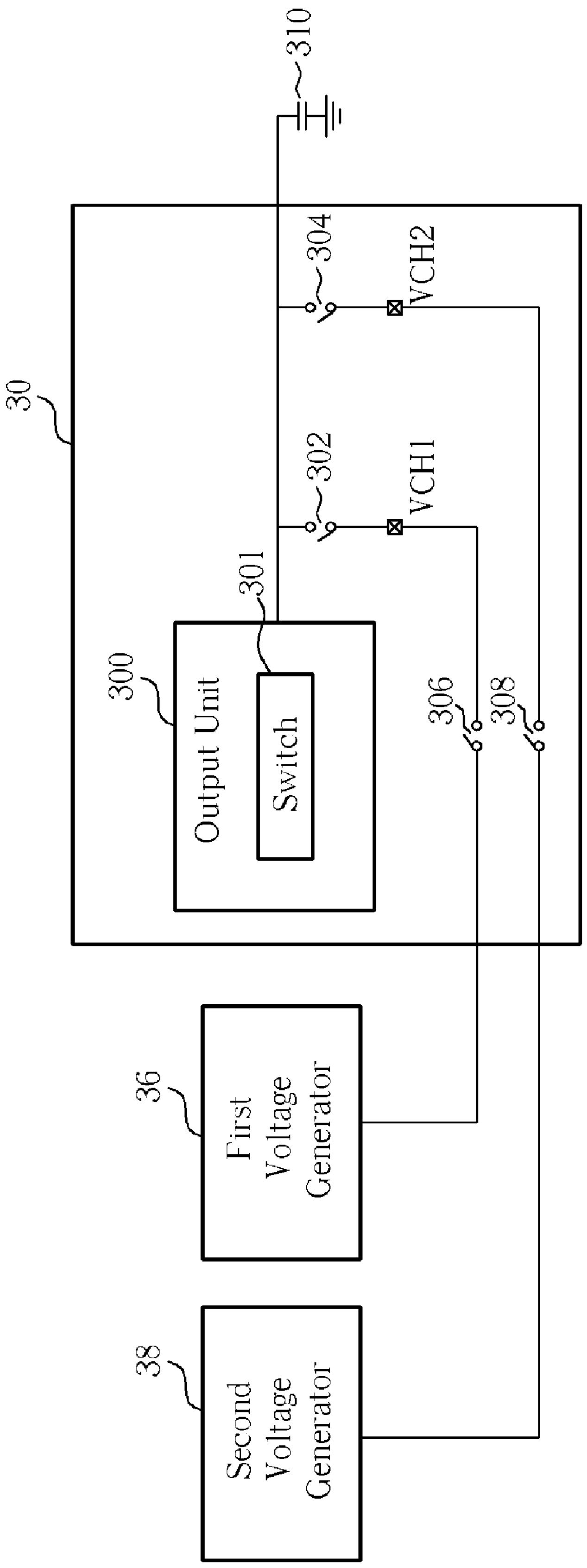
FIG. 3 is a block diagram of an electronic device of a source driver in an LCD device according to an embodiment of the present invention.
Figure 4:
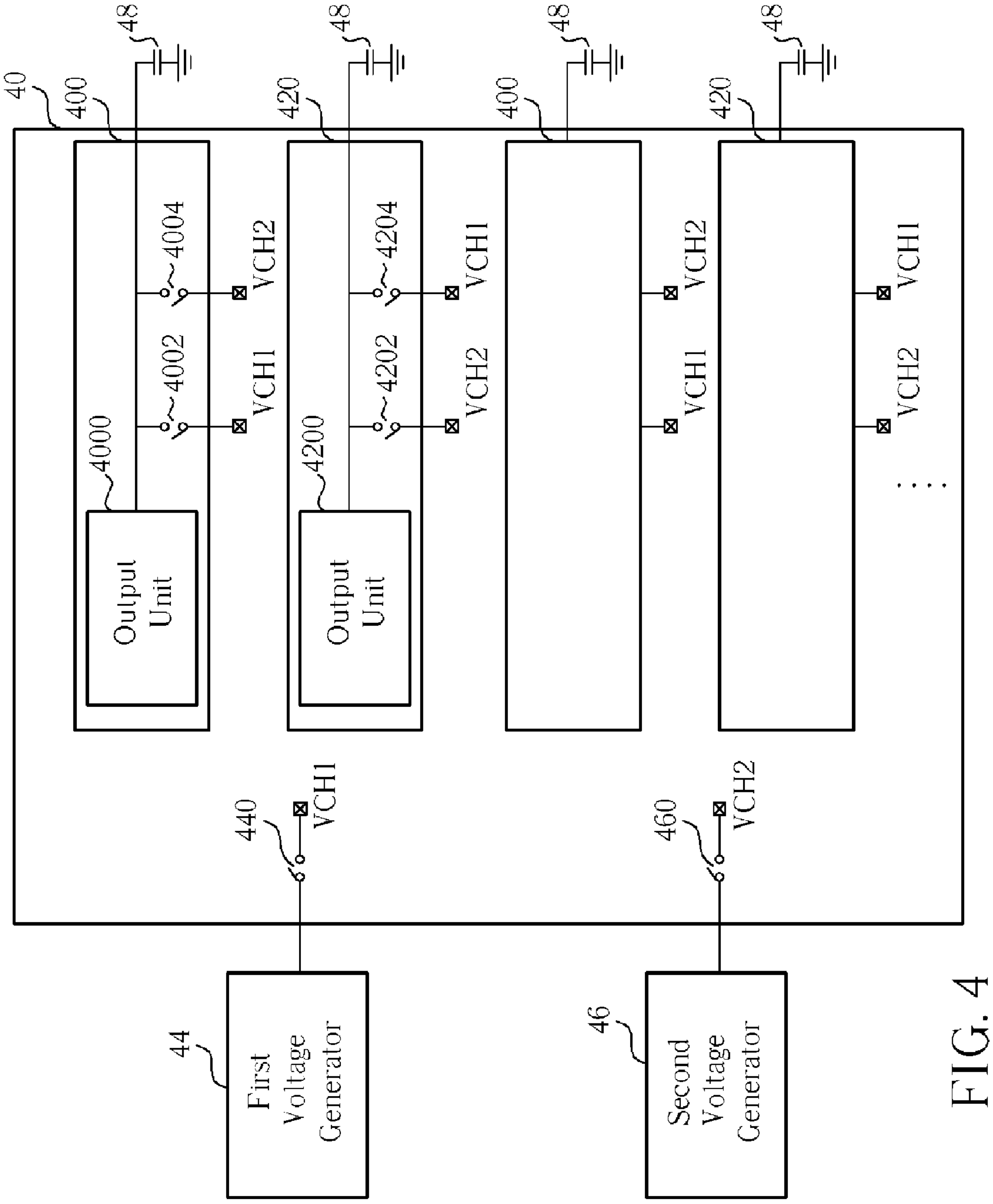
FIG. 4 is a block diagram of an electronic device of a source driver in an LCD device according to an embodiment of the present invention.
Figure 5:
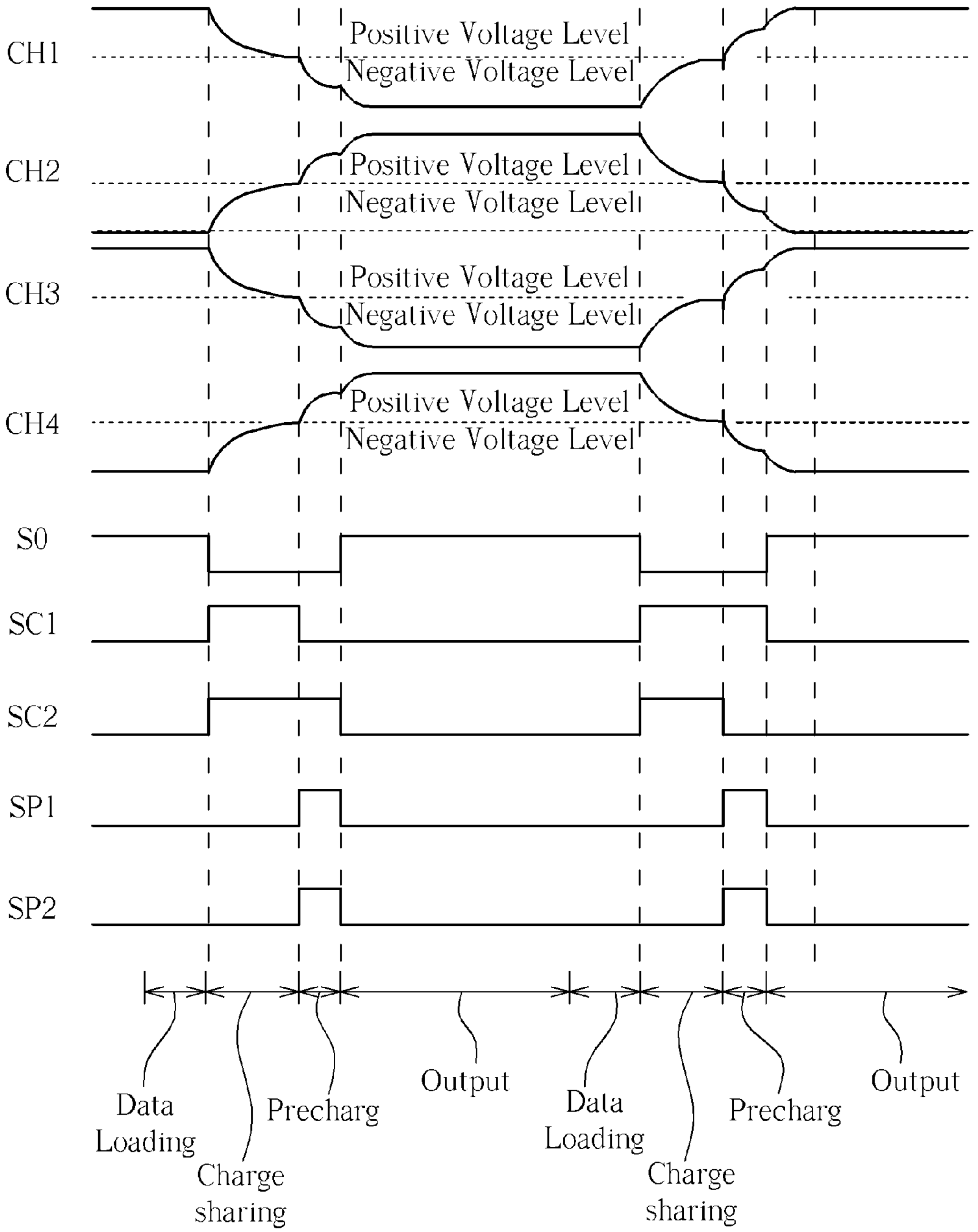
FIG. 5 is a timing diagram of the electronic device in FIG. 4.

Please refer to FIG. 3 to FIG. 5. FIG. 3 is a block diagram of an electronic device 30 of a source driver in an LCD device according to an embodiment of the present invention. The electronic device 30 is utilized for enhancing accuracy of voltage outputted to an equivalent capacitor 310 of a panel of the LCD device. The electronic device 30 comprises a first node VCH1, a second node VCH2, an output unit 300, a first charge sharing switch 302, a second charge sharing switch 304, a first precharge switch 306, and a second precharge switch 308. Output unit 300 coupled to the equivalent capacitor 310 comprises a switch 301, for generating an analog signal and outputting the analog signal by the switch 301 according to a control signal S0 generated by the source driver. One terminal of the first charge sharing switch 302 and one terminal of the second charge sharing switch 304 are coupled to the output unit 300 and the equivalent capacitor 310. The other terminal of the first charge sharing switch 302 and the other terminal of the second charge sharing switch 304 are respectively coupled to the first node VCH1 and the second node VCH2. The first charge sharing switch 302 and the second charge sharing switch 304 are utilized for controlling the connections between the two terminals of each charge sharing switch according to a first control signal SC1 and a second control signal SC2. The first precharge switch is coupled between the first node VCH1 and a first voltage generator 36, for controlling the connections between the two terminals of the first precharge switch 306 according to a third control signal SP1. The second precharge switch 308 is coupled between the second node VCH2 and a second voltage generator 38, for controlling the connections between the two terminals of the second precharge switch 308 according to a fourth control signal SP2. In addition, the first voltage generator 36 and the second voltage generator 38 are utilized for generating voltages with opposite polarity.

When the output unit 300 outputs the analog signal to the equivalent capacitor 310 according to the control signal S0, the first control signal SC1, the second control signal SC2, the third control signal SP1 and the fourth control signal SP2 are respectively used to turn off the first charge sharing switch 302, the second charge sharing switch 304, the first precharge switch 306 and the second precharge switch 308. On the other hand, when the output unit 300 does not output the analog signal according to the control signal S0, the first control signal SC1, the second control signal SC2, the third control signal SP1 and the fourth control signal SP2 are respectively used to control the first charge sharing switch 302, the second charge sharing switch 304, the first precharge switch 306 and the second precharge switch 308 for performing charge sharing and precharging.

Charge sharing will now be explained in detail. When the first control signal SC1 and the second control signal SC2 are in a first voltage level and the third control signal SP1 and the fourth control signal SP2 are in a second voltage potential, the first charge sharing switch 302 and the second charge sharing switch 304 are turned on, and the first precharge switch 306 and the second precharge switch 308 are turned off. In this situation, the source driver performs charge sharing on the equivalent capacitor 310. Note that the first voltage level and the second voltage level are different for presentation of the states of each control signal. During charge sharing, charge on the equivalent capacitor 310 is transmitted to the first node VCH1 and the second node VCH2 by the first charge sharing switch 302 and the second charge sharing switch 304.

Because the first precharge switch 306 and the second precharge switch 308 are turned off, the first node VCH1 and the second node VCH2 can be regarded as a common terminal. Therefore, a current limiting resistor on the current path of charge sharing is regarded as a parallel resistor of the first charge sharing switch 302 and the second charge sharing switch 304. Let an ON-resistance of a transistor switch be R, so that the current limiting resistor is 1/2×R. Compared with the prior art, the electronic device 30 can decrease the current limiting resistor from R to 1/2×R.

Precharge will now be explained in detail. When the first control signal SC1, the third control signal SP1 and the fourth control signal SP2 are in a first voltage level and the second control signal SC2 is in a second voltage level, the first charge sharing switch 302, the first precharge switch 306 and the second precharge switch 308 are turned on and the second charge sharing switch 304 is turned off. Therefore, the voltage level of each channel can be pulled to the voltage level generated by the first voltage generator 36 by the first charge sharing switch 302 and the first precharge switch 306, that is, the source driver performs precharging on the equivalent capacitor 310. On the other hand, when the second control signal SC2, the third control signal SP1 and the fourth control signal SP2 are in a first voltage level and the first control signal SC1 is in a second voltage level, the second charge sharing switch 304, the first precharge switch 306 and the second precharge switch 308 are turned on and the first charge sharing switch 302 is turned off. Therefore, the voltage level of each channel can be pulled to the voltage level generated by the second voltage generator 38 by the second charge sharing switch 304 and the second precharge switch 308, thus is, the source driver performs precharging on the equivalent capacitor 310. In other words, precharging is going on only when both of the first precharge switch 306 and the second precharge switch 308 are turned on, and only one of the first charge sharing switch 302 and the second charge sharing switch 304 is turned on.

During precharging, the current limiting resistor on the current path of precharging is regarded as a serial resistor of the first charge sharing switch 302 and the first precharge switch 306 (or a serial resistor of the second charge sharing switch 304 and the second precharge switch 308.) Let an ON-resistance of a transistor switch be R, so that the current limiting resistor is R+R=2R. Note that the electronic device 30 is utilized for driving single channel. The advantage of the electronic device 30 is obvious when used in a source driver with a large amount of channels.

Please refer to FIG. 4. FIG. 4 is a block diagram of an electronic device 40 of a source driver in an LCD device according to an embodiment of the present invention. Actually, the electronic device 40 is equivalent to a composition of a plurality of the electronic devices 30. The electronic device 30 is utilized for driving single channel, while the electronic device 40 is utilized for driving all of channels of the source driver. The electronic device 40 comprises a first node VCH1, a second node VCH2, a plurality of first output devices 400, a plurality of second output devices 420, a first precharge switch 440, and a second precharge switch 460. Each first output device 400 coupled to an equivalent capacitor 48 of a panel of the LCD device comprises an output unit 4000, a first charge sharing switch 4002 and a second charge sharing switch 4004. Similarly, each second output device 420 coupled to the equivalent capacitor 48 comprises an output unit 4200, a first charge sharing switch 4202 and a second charge sharing switch 4204. Each first output device 400 is adjacent to each second output device 420 in the source driver, for respectively driving odd channels and even channels. The first precharge switch 440 is coupled between the first node VCH1 and a first voltage generator 44. The second precharge switch 460 is coupled between the second node VCH2 and a second voltage generator 46. The first voltage generator 44 and the second voltage generator 46 are utilized for generating voltages with opposite polarity.

From the above, the first node VCH1, the second node VCH2, the first precharge switch 440 and the second precharge switch 460 are jointly used by the plurality of first output devices 400 and the plurality of second output devices 420. In other words, when using the plurality of the electronic devices 30 in the source driver, the plurality of the electronic devices 30 can jointly use the first node VCH1, the second node VCH2, the first precharge switch 306 and the second precharge switch 308.

The operation scheme of each output unit, charge sharing switch and precharge switch in the electronic device 40 are similar to those in the electronic device 30 and are not given here. The difference between the first output device 400 and the second output device 420 is that in the first output device 400, the first charge sharing switch 4002 is coupled to the first node VCH1 and the second charge sharing switch 4004 is coupled to the second node VCH2, while in the second output device 420, the first charge sharing switch 4202 is coupled to the second node VCH2 and the second charge sharing switch 4204 is coupled to the first node VCH1. Therefore, during precharging, each first charge sharing switch (or each second charge sharing switch) turned on results in outputs of the first output device 400 and the second output device 420 being pulled to the voltage level with opposite polarity.

The current limiting resistor on the current path of precharging is 2R in the electronic device 30. It seems that the current limiting resistor is enlarged in comparison with the prior art. Let an amount of channels of the source driver be N. All of channels of the source driver jointly use the first precharge switch 440 and the second precharge switch 460,so that for each channel, the current limiting resistor resulted by the first precharge switch 440 and the second precharge switch 460 is 1/(2/N)×R. Take the first output unit 400 as an example, the total current limiting resistor on the current path of precharging is equal to the sum of the equivalent resistor of the first charge sharing switch 4002 (or the second charge sharing switch 4004) and the current limiting resistor resulted by the first precharge switch 440 and the second precharge switch 460, R+1/(N/2)×R. If N is large, R+1/(N/2)×R≈R. In comparison with the prior art, the embodiment of the present invention does not enlarge the current limiting resistor on the current path of precharging.

In addition, the electronic device 10 comprises two precharge switches so that the source driver with N channels comprises 2N precharge switches when using the electronic device 10 to drive each channel. In comparison, the source driver just comprises two precharge switches when using the electronic device 40 to drive each channel, thereby the area efficiency ratio of the precharge switches is N. Take a source driver with 384 channels as an example, the source driver with 384 channels needs 384×2=768 precharge switches when using the electronic device 10, while the same source driver needs only 2 precharge switches when using the electronic device 40. Thereby, the area efficiency ratio of the precharge switches is 384. Moreover, for each channel, the current limiting resistor on the current path of precharging is R+1/(384/2)×R=R+1/192×R≈R, that is, the output voltage accuracy of the source driver is not decreased.

Please refer to FIG. 5. FIG. 5 is a timing diagram of the electronic device 40. FIG. 5 illustrates the relationship between the voltage level of the equivalent capacitor of the panel and the control signals of charge sharing and precharge switches. CH1, CH2, CH3 and CH4 represent the output voltage of adjacent channels. CH1 and CH3 represent the output voltage of odd channels, while CH2 and CH4 represent the output voltage of even channels. S0 is the output control signal for controlling all of the output units 4000 and 4200. SC1 is the control signal for controlling all of the first charge sharing switches 4002 and 4202. SC2 is the control signal for controlling all of the second charge sharing switches 4004 and 4204. SP1 is the control signal for controlling all of the first precharge switches 440. SP2 is the control signal for controlling all of the second precharge switches 460. Note that FIG. 5 is a timing diagram of the electronic device 40, and those skilled in the art can make alterations and modifications accordingly. For example, CH1, CH2, CH3 and CH4 can also represent the output voltage with opposite polarity in comparison with those in FIG. 5 because the first voltage generator 44 and the second voltage generator 46 are utilized for generating voltages with opposite polarity.

In conclusion, the present invention can decrease the current limiting resistor on the current path of charge sharing to 1/2×R for reusing charge more quickly, and moreover, keep the current limiting resistor on the current path of precharging but decrease a large amount of transistor switches used for precharging. As a result, the present invention not only enhances output voltage accuracy, but also decreases the charge time to the expected voltage level, so as to reduce production cost and make products more competitive.

Those skilled in the art will readily observe that numerous modifications and alterations of the device and method may be made while retaining the teachings of the invention.

What is claimed is:

1. An electronic device of a source driver in an LCD device, for enhancing accuracy of voltage outputted to an equivalent capacitor of a panel of the LCD device comprising:

a first node;

a second node;

an output unit coupled to the source driver and the equivalent capacitor, for outputting an analog signal according to the signal generated by the source driver;

a first charge sharing switch comprising a first terminal coupled to the output unit and the equivalent capacitor and a second terminal coupled to the first node, for controlling the connection between the first terminal of the first charge sharing switch and the second terminal of the first charge sharing switch according to a first control signal;

a second charge sharing switch comprising a first terminal coupled to the output unit and the equivalent capacitor and a second terminal coupled to the second node, for controlling the connection between the first terminal of the second charging sharing switch and the second terminal of the second charging sharing switch according to a second control signal;

a first precharge switch comprising a first terminal coupled to the first node and a second terminal coupled to a first voltage generator, for controlling the connection between the first terminal of the first precharge switch and the second terminal of the first precharge switch according to a third control signal; and a second precharge switch comprising a first terminal coupled to the second node and a second terminal coupled to a second voltage generator, for controlling the connection between the first terminal of the second precharge switch and the second terminal of the second precharge switch according to a fourth control signal;

wherein the equivalent capacitor performs charge sharing by providing a shared charge to the first and second nodes when the first and second charge sharing switches are turned on and the first and the second precharge switches are turned off.

2. The electronic device of claim 1, wherein the output unit does not output the analog signal when the source driver performs charge sharing and precharging on the equivalent capacitor.

3. The electronic device of claim 1, wherein the source driver performs charge sharing on the equivalent capacitor when the first and the second control signals are in a first voltage level and the third and the fourth control signals are in a second voltage level.

4. The electronic device of claim 3, wherein the first voltage level and the second voltage level are different, and the first and the second charge sharing switches are turned on, and the first and the second precharge switches are turned off.

5. The electronic device of claim 1, wherein the source driver performs precharging on the equivalent capacitor when the first, the third and the fourth control signals are in a first voltage level and the second control signal is in a second voltage level.

6. The electronic device of claim 5, wherein the first voltage level and the second voltage level are different, and the first and the second precharge switches are turned on, the first charge sharing switch is turned on, and the second charge sharing switch is turned off.

7. The electronic device of claim 1, wherein the source driver performs precharging on the equivalent capacitor when the second, the third and the fourth control signals are in a first voltage level and the first control signal is in a second voltage level.

8. The electronic device of claim 7, wherein the first voltage level and the second voltage level are different, and the first and the second precharge switches are turned on, the second charge sharing switch is turned on, and the first charge sharing switch is turned off.

9. An electronic device of a source driver in an LCD device, for enhancing accuracy of voltage outputted to a plurality of equivalent capacitors of a panel of the LCD device comprising:

a first node;

a second node;

a plurality of first output devices, each first output device comprising:

an output unit coupled to the source driver and one of the plurality of equivalent capacitors, for outputting an analog signal according to the signal generated by the source driver;

a first charge sharing switch comprising a first terminal coupled to the output unit and the equivalent capacitor and a second terminal coupled to the first node, for controlling the connection between the first terminal of the first charge sharing switch of the first output device and the second terminal of the first charge sharing switch of the first output device according to a first control signal; and a second charge sharing switch comprising a first terminal coupled to the output unit and the equivalent capacitor and a second terminal coupled to the second node, for controlling the connection between the first terminal of the second charge sharing switch of the first output device and the second terminal of the second charge sharing switch of the first output device according to a second control signal;

a plurality of second output devices, each second output device comprising:

an output unit coupled to the source driver and one of the plurality of equivalent capacitors, for outputting an analog signal according to the signal generated by the source driver;

a first charge sharing switch comprising a first terminal coupled to the output unit and the equivalent capacitor and a second terminal coupled to the second node, for controlling the connection between the first terminal of the first charge sharing switch of the second output device and the second terminal of the second charge sharing switch of the second output device according to the first control signal; and a second charge sharing switch comprising a first terminal coupled to the output unit and the equivalent capacitor and a second terminal coupled to the first node, for controlling the connection between the first terminal of the second charge sharing switch and the second terminal of the second charge sharing switch according to the second control signal;

wherein the first control signal is associated with both the first charge sharing switch of the each first output device and the first charge sharing switch of the each second output device, and the second control signal is associated with both the second charge sharing switch of the each first output device and the second charge sharing switch of the each second output device;

a first precharge switch comprising a first terminal coupled to the first node and a second terminal coupled to a first voltage generator, for controlling the connection between the first terminal of the first precharge switch and the second terminal of the first precharge switch according to a third control signal; and a second precharge switch comprising a first terminal coupled to the second node and a second terminal coupled to a second voltage generator, for controlling the connection between the first terminal of the second precharge switch and the second terminal of the second precharge switch according to a fourth control signal;

wherein at least one of the plurality of equivalent capacitors performs charge sharing by providing a shared charge to the first and second nodes when the first and second charge sharing switches of at least one of the first and second output units are turned on and the first and second precharge switches of the at least one of the first and second precharge units are turned off.

10. The electronic device of claim 9, wherein the output unit of each first output device does not output the analog signal when the source driver performs charge sharing and precharging on the plurality of equivalent capacitors.

11. The electronic device of claim 9, wherein the output unit of each second output device does not output the analog signal when the source driver performs charge sharing and precharging on the plurality of equivalent capacitors.

12. The electronic device of claim 9, wherein the source driver performs charge sharing on the plurality of equivalent capacitors when the first and the second control signals are in a first voltage level and the third and the fourth control signals are in a second voltage level.

13. The electronic device of claim 12, wherein the first voltage level and the second voltage level are different, and the first and the second charge sharing switches of the first output device are turned on, the first and the second charge sharing switches of the second output device are turned on, the first and the second precharge switches are turned off

14. The electronic device of claim 9, wherein the source driver performs precharging on the plurality of equivalent capacitors when the first, the third and the fourth control signals are in a first voltage level and the second control signal is in a second voltage level.

15. The electronic device of claim 14, wherein the first voltage level and the second voltage level are different, and the first and the second precharge switches are turned on, the first charge sharing switch of the first output device and the second charge sharing switch of the second output device are turned on, and the second charge sharing switch of the first output device and the first charge sharing switch of the second output device are turned off.

16. The electronic device of claim 9, wherein the source driver performs precharging on the plurality of equivalent capacitors when the second, the third and the fourth control signals are in a first voltage level and the first control signal is in a second voltage level.

17. The electronic device of claim 16, wherein the first voltage level and the second voltage level are different.

18. The electronic device of claim 1, wherein when the first and the second precharge switches are turned on, at least one of the first and the second charge sharing switches is turned off

19. The electronic device of claim 9, wherein when the first and the second precharge switches are turned on, at least one of the first and the second charge sharing switches of the first output device is turned off, and at least one of the first and the second charge sharing switches of the second device is turned off.

20. The electronic device of claim 9, wherein when the source driver performs charge sharing on the plurality of equivalent capacitors, the charges of the plurality of equivalent capacitors are shared through the first and the second charge sharing switches of each of the plurality of the first and the second output devices.

* * * * *